(12) United States Patent
Pasching

(10) Patent No.: US 11,578,918 B2
(45) Date of Patent: Feb. 14, 2023

(54) HANDHELD BLOWER DEVICE

(71) Applicant: AIRFFECT GMBH, Vienna (AT)

(72) Inventor: Andreas Pasching, Vienna (AT)

(73) Assignee: AIRFFECT GMBH, Vienna (AT)

( * ) Notice: Subject to any disclaimer, the term of this patent is extended or adjusted under 35 U.S.C. 154(b) by 223 days.

(21) Appl. No.: 16/348,374

(22) PCT Filed: Nov. 9, 2017

(86) PCT No.: PCT/AT2017/000076
§ 371 (c)(1),
(2) Date: May 8, 2019

(87) PCT Pub. No.: WO2018/085868
PCT Pub. Date: May 17, 2018

(65) Prior Publication Data
US 2020/0056843 A1    Feb. 20, 2020

(30) Foreign Application Priority Data

Nov. 9, 2016   (DE) .......................... 102016121482.5
Apr. 11, 2017  (DE) .......................... 102017107865.7
(Continued)

(51) Int. Cl.
F26B 21/00      (2006.01)
B60S 3/04       (2006.01)
(52) U.S. Cl.
CPC ............. *F26B 21/001* (2013.01); *B60S 3/044* (2013.01)
(58) Field of Classification Search
CPC ...... F26B 21/001; F26B 21/004; F26B 9/003; B60S 3/002; B60S 3/044; B08B 3/026
(Continued)

(56) References Cited

U.S. PATENT DOCUMENTS 2,586,145 A * 2/1952 Breuer .................... A47L 9/242
                                                    239/592
3,564,826 A * 2/1971 Middleton, Jr. ..... A01D 46/005
                                                    56/328.1
(Continued)

FOREIGN PATENT DOCUMENTS

DE       3618043 A1    12/1987
GB       2416673 A      2/2006

OTHER PUBLICATIONS

International Search Report dated Mar. 7, 2018 issued in corresponding International Application No. PCT/AT2017/000076 with English translation.

(Continued)

*Primary Examiner* — Edelmira Bosques
*Assistant Examiner* — Bao D Nguyen
(74) *Attorney, Agent, or Firm* — Pillsbury Winthrop Shaw Pittman, LLP

(57) ABSTRACT

The invention relates to a handheld blower device for the manual pneumatic drying of surfaces by a user of the handheld blower device, comprising a flat nozzle device for ejecting compressed air from the handheld blower device onto the surface to be dried, a handle region, in particular a handle, for manually gripping and guiding the flat nozzle device over the surface to be dried, and a conveying device for conveying the compressed air to the flat nozzle device, wherein the flat nozzle device comprises a flat nozzle, and the conveying device is configured with a stationarily arranged, in particular fixedly arranged, high-pressure blower.

19 Claims, 7 Drawing Sheets

(30) Foreign Application Priority Data

Jul. 13, 2017 (AT) .............................. GM 160/2017
Aug. 18, 2017 (AT) .............................. GM 178/2017

(58) Field of Classification Search
USPC ......................................................... 34/666
See application file for complete search history.

(56) References Cited

U.S. PATENT DOCUMENTS

| | | | |
|---|---|---|---|
| 4,848,670 A * | 7/1989 | Belanger ................ | B60S 3/002 239/553 |
| 6,021,584 A | 2/2000 | Schwartz | |
| 6,286,228 B1 | 9/2001 | Bodnar et al. | |
| 7,033,137 B2 * | 4/2006 | Shufeldt ............... | F04D 23/008 416/185 |
| 2002/0129515 A1 | 9/2002 | Morris et al. | |
| 2004/0143990 A1 | 7/2004 | Cammisano | |
| 2005/0252034 A1 * | 11/2005 | Suss ..................... | F26B 17/026 34/633 |
| 2008/0216338 A1 * | 9/2008 | Doyle .................... | B60S 3/002 34/60 |
| 2012/0291303 A1 * | 11/2012 | Courtney ............... | A47K 10/48 34/202 |
| 2013/0097885 A1 * | 4/2013 | Dyson ................. | B29C 45/0055 34/201 |

OTHER PUBLICATIONS

International Preliminary Report on Patentability dated Oct. 16, 2018 issued in corresponding International Application No. PCT/AT2017/000076 (18 pgs.).

Written Opinion of the International Searching Authority dated May 17, 2018 issued in corresponding International Application No. PCT/AT2017/000076 (6 pgs.).

* cited by examiner

HANDHELD BLOWER DEVICE

CROSS-REFERENCE TO RELATED APPLICATIONS

This is the U.S. National Stage of PCT/AT2017/000076, filed Nov. 9, 2017, which claims priority to German Patent Application No. 10 2016 121 482.5, filed Nov. 9, 2016, German Patent Application No. 10 2017 107865.7, filed Apr. 11, 2017, Austrian Patent Application No. GM 160/2017, filed Jul. 13, 2017, and Austrian Patent Application No. GM 178/2017, filed Aug. 18, 2017, and all contents of each of these applications are incorporated herein by reference in their entireties.

The invention relates to a handheld blower device for the manual pneumatic drying of surfaces by a user of the handheld blower device, comprising a flat nozzle device for ejecting compressed air from the handheld blower device, a handle region, in particular a handle, for manually gripping and guiding the flat nozzle device over the surface to be dried, and a conveying device for conveying the compressed air to the flat nozzle device.

Handheld blower devices in the sense of the invention are drying devices for drying wet or moist surfaces, which are manually guided by hand or manually by a user of the handheld blower device. Wet or moist surface, in particular, include wet window panes, wet facades, or washed vehicles, which are to be dried. To this end, the handheld blower device comprises a handle region, by which it can be held by the hand of its user. There, the user grips the handheld blower device and guides it manually over the surface. The surface is pneumatically dried by compressed air, or air under pressure, blowing away from the surface the humidity or moisture present on the surface. In doing so, the air streams out of a flat nozzle device of the handheld blower device. The flat nozzle device selectively directs the air ejected from the handheld blower device onto the surface to be dried.

The invention is based on the object to provide a handheld blower device by which an excellent drying result is to be achieved. Conventional handheld blower devices by contrast frequently deliver rather dull surfaces after drying.

According to the invention, this object is achieved by a handheld blower device for the manual pneumatic drying of surfaces by a user, comprising a flat nozzle device for ejecting compressed air from the handheld blower device onto the surface to be dried, a handle region, in particular a handle for manually gripping and manually guiding the flat nozzle device over the surface to be dried, and a conveying device for conveying the compressed air to the flat nozzle device. The flat nozzle device comprises a flat nozzle, and the conveying device is configured with a stationarily arranged, in particular fixedly arranged, high-pressure blower.

In the handheld blower device according to the invention, the conveying device for conveying compressed air to the movable and manually guided flat nozzle device is configured with a high-pressure blower. The high-pressure blower pressurizes the air to a high pressure and conveys it to the flat nozzle device. The invention thus combines a manually easily movable and hence individually orientable flat nozzle with a comparatively heavy and rather clumsy pressure generator. The configuration of a high-pressure blower as a stationary device implies that the high-pressure blower is, in particular, housed in a housing that is separate from the flat nozzle device and from which the compressed air can be conducted to the flat nozzle device via a flexible connection.

According to a preferred configuration, it is provided that the conveying device comprises a flexible hose connecting the high-pressure blower to the flat nozzle device. The separate housing can be stationarily positioned or provided with rollers or the like so as to be movable from one stationary position to another stationary position.

As has been demonstrated by the solution according to the invention, it has become possible by the high-pressure blower according to the invention to provide in an economical manner at the flat nozzle device the amount of air required there for the desired drying function. Moreover, the flat nozzle device can itself be of a sufficiently small-structured and light-weight design so as to be still manually movable by a user of the handheld blower device according to the invention. The solution according to the invention contrasts strongly with conventional drying devices such as a hair drier, which uses as a conveying device a low-pressure blower or, at best, a medium-pressure blower with a compression of below 10 mbar.

However, the solution according to the invention is also in contrast to other conventional drying devices such as in carwash installations, because there the flat nozzle device cannot be moved manually and oriented individually.

The high-pressure blower according to the invention advantageously comprises a maximum compression or maximum counter-pressure of more than 150 mbar, preferably between 150 and 600 mbar, in particular between 150 and 500 mbar.

In a particularly advantageous manner, the high-pressure blower according to the invention comprises a maximum counter-pressure of more than 250 mbar, preferably between 250 and 450 mbar, in particular between 250 and 400 mbar.

The current draw of the high-pressure blower according to the invention preferably occurs at about 400 V and its power consumption advantageously ranges between 3 and 10 kW, preferably between 5 and 10 kW. In a particularly preferred manner, the high-pressure blower according to the invention is designed as a side channel compressor. A side channel compressor is actually of particular advantage for suction operation, yet according to the invention it is used for blowing operation. To the invention, the side channel compressor advantageously offers a higher compression and conveying rate than usual axial or radial fans.

A side channel compressor comprises a rapidly rotating blade wheel. The blade wheel is disposed at a certain distance to an enclosing housing. This region is called side channel. Its mode of action is similar to that of several consecutively arranged radial fans. The conveyed air flows laterally between conveying blades of the blade wheel and, at the same time, is accelerated in the direction of rotation and outwardly into the side channel due to the rapid rotation (centrifugal force). The air is thereby compressed. In the side channel, the compressed air laterally again enters between a next cell of conveying blades. Between the inlet and the outlet of the side channel compressor, the air rotates several times between a conveying blade and the side channel and is compressed several times during a revolution of the blade wheel. The pressure increase is approximately linear over the length of the side channel.

A side channel compressor operates wear-free, since no movable part contacts the housing. Unlike radial fans, the demands on the design of the exit channel are minimal. A side channel compressor thus also allows for a smaller structure, which is of particular advantage for the solution according to the invention. The solution according to the invention advantageously, therefore, is also configured with a side channel compressor as high-pressure blower, said side channel compressor being arranged so as to be manually movably together with the flat nozzle device of the handheld blower device.

According to the invention, the high-pressure blower is preferably stationarily arranged.

By "stationarily" is meant an arrangement in which the high-pressure blower is at least positioned on a base and optionally movable thereon in a largely horizontal sense. Such a base may, in particular, be a carriage, which is movable together with the high-pressure blower.

Otherwise, the high-pressure blower according to the invention is preferably arranged in a completely stationary and hence immovable manner. In this case, the high-pressure blower may comprise a high delivery rate and a high delivery pressure.

Furthermore, the handheld blower device according to the invention, along with the high-pressure blower, provides a volume flow of 200 to 1000 m$^3$/h, preferably 300 to 850 m$^3$/h, preferably 350 to 500 m$^3$/h, preferably 350 to 450 m$^3$/h, in particular 400 to 420 m$^3$/h, due to the flat nozzle device. Alternatively, a volume flow of 50 to 500 m$^3$/h is achievable with the high-pressure blower due to the flat nozzle device. To this end, the drive motor of the high-pressure blower is connected to a control device set to drive the high-pressure blower for generating an appropriate volume flow.

The pneumatic drying of surfaces by means of compressed air involves the problem of designing the parameters of the air application to the surface such that the amount of air applied per unit time will ensure a rapid drying result, yet the impulse exerted on the water droplets by the air flow will not be so strong as to atomize the water droplets. The atomization or breaking of the water droplets adhering to the surface will in fact result in the thus formed water mist being no longer completely and rapidly removable from the surface. This will lead to an incomplete drying result and a dull surface.

Based on experiments, it has been found that the selection of a suitable flow rate is an important parameter in order to optimize the air application to the surface. In this context, it is contemplated in a particularly preferred manner that a flow rate of 50 to 300 m/s, preferably 100 to 200 m/s, preferably 100 to 150 m/s, in particular 120 to 130 m/s is provided by the high-pressure blower due to the flat nozzle device. Said flow rate preferably is the rate measured directly at the exit of the nozzle. Such an air flow will lead to optimum drying results. The desired flow rate at a pregiven volume flow in this case is adjusted by selecting a nozzle with a suitable exit surface.

A particularly preferred embodiment contemplates that a volume flow of 300 to 650 m$^3$/h is provided by the high-pressure blower due to the flat nozzle device and the exit surface of the flat nozzle is selected to reach a flow rate of 100 to 200 m/s, measured directly at the nozzle exit.

It is preferably contemplated that a volume flow of 350 to 450 m$^3$/h is provided by the high-pressure blower due to the flat nozzle device and the exit surface of the flat nozzle is selected to reach a flow rate of 100 to 150 m/s, measured directly at the nozzle exit.

It is preferably contemplated that a volume flow of 400 to 420 m$^3$/h is provided by the high-pressure blower due to the flat nozzle device and the exit surface of the flat nozzle is selected to reach a flow rate of 120 to 130 m/s, measured directly at the nozzle exit.

Since the flat nozzle device, as a rule, is not held directly at the surface to be dried but at a distance (as small as possible though) therefrom, a preferred configuration contemplates that a flow rate of 40 to 100 m/s, preferably 50 to 90 m/s, preferably 60 to 80 m/s, in particular 70 to 80 m/s, measured at a distance of 7 cm from the nozzle exit in the flow direction, is provided by the high-pressure blower due to the flat nozzle device.

The conveying device is preferably further equipped with a flexible hose. The hose diameter of the flexible hose preferably ranges between 30 and 100 mm, preferably between 40 and 100 mm, preferably between 50 and 90 mm, in particular between 50 and 70 mm. The hose length is preferably selected between 5 and 10 m, in particular between 7 and 9 m. Within the hose, a flow rate of 20 to 100 m/s, preferably 30 to 90 m/s, in particular 60 to 80 m/s, is preferably provided by the high-pressure blower according to the invention. Such a hose between the conveying device and the flat nozzle device is comparably easy to handle while, at the same time, providing together with the flat nozzle device the suitable counter-pressure for the conveying device according to the invention.

The flow rate of the air at the nozzle exit is determined by the volume flow and the exit surface of the flat nozzle. An increase in the exit surface will result in an increase in the volume flow. An increase of the exit surface will result in a decrease of the flow rate. A preferred configuration in this context provides that the flat nozzle is formed with a flat nozzle slot having an exit surface of 500 to 1500 mm$^2$, preferably 700 to 1200 mm$^2$, in particular 850 to 950 mm$^2$.

The flat nozzle device of the handheld blower device according to the invention is provided with a flat nozzle preferably formed with an exit width of 100 to 300 mm, preferably 150 to 250 mm, preferably 150 to 200 mm, in particular 175 to 185 mm.

In a particularly preferred manner, the flat nozzle is formed with an exit height of 0.5 to 20 mm, preferably 2 to 8 mm, in particular 4 to 6 mm, in particular about 5 mm. Such a flat nozzle device is cost-effective to produce, easy to handle and, at the same time, yields excellent drying results.

The exit height and the exit width are preferably selected within the above-identified ranges so as to result in the above-identified, preferred exit surface values.

In order to ensure the application of as flat and wide an air jet as possible to the surface to be dried, it is preferably provided that the flat nozzle is formed with a substantially rectangular flat nozzle slot whose ratio of exit width to exit height ranges from 25 to 60, preferably from 30 to 40, in particular from 33 to 38. This enables the air to provide an optimum drying effect not only in points. Besides, controlled and uniform properties of the air application over the entire area on which the air impinges on the surface will thereby be ensured. This applies, in particular, if the flat nozzle is held such that the exit width extends in parallel with the surface to be dried.

Preferably, a grip plate for holding the flat nozzle device by the user can be provided on the flat nozzle. The grip plate may be located on the flat nozzle device in the immediate vicinity of its flat nozzle, thus enabling the user of the flat nozzle device to precisely guide and orient the flat nozzle. This is of particular importance, because the user has to guide the flat nozzle very selectively over the surface to be dried in order to achieve an excellent drying result, as was demonstrated by experiments according to the invention. The solution according to the invention also enables the removal of water/dust particles and dust particles alone in addition to water droplets from surfaces so as to ensure drying and cleaning of the respective surfaces.

The flat nozzle device according to the invention is preferably formed with a tube for supplying the compressed air to the flat nozzle, and the flat nozzle is, moreover, formed with a flat nozzle slot that is oriented so as to be inclined at an angle smaller than 90° relative to the longitudinal axis of the tube. The thus oriented flat nozzle slot is deliberately inclined relative to the longitudinal axis of the tube rather than extending transversely or at a right angle to said longitudinal axis of the tube supplying compressed air. The supplied air is thus laterally deflected at the flat nozzle. In this manner, it has become easier for the user of the flat nozzle device to dry both a horizontally extending surface and a vertically extending surface. With both surfaces, the flat nozzle in such way advantageously designed according to the invention, can be brought to the surface such that the air ejected there is able to both blow away the water present on the surface in the direction of movement and push it aside transversely to the direction of movement to a further row to be swept.

Preferably, the flat nozzle slot is, in particular, oriented so as to be inclined at an angle between 45° and 75° relative to the longitudinal axis of the tube. In a particularly preferred manner, the flat nozzle slot is oriented so as to be inclined at an angle of 60° relative to the longitudinal axis of the tube. Such an orientation, on the one hand, enables nozzling at the surface to be dried, in particular if the latter extends horizontally or perpendicularly, and, on the other hand, renders handling of such a flat nozzle device particularly easy for the user. In addition, it has been shown that such an orientation of the flat nozzle slot directs the air ejected there in a particularly advantageous manner. The emitted air is in fact deflected within the flat nozzle so as to increasingly emerge on one side of the flat nozzle slot. On that side of the flat nozzle slot, a particularly strong drying effect will be achieved. However, on the other side of the flat nozzle slot less air will escape, yet to an increased extent transversely to the longitudinal axis of the tube. This air produces a lateral flow by means of which the liquid on the surface to be dried is increasingly urged aside.

In a particularly advantageous manner, the flat nozzle slot terminates within the projection surface of the tube by one of its two ends. When looking at the tube in the direction of the longitudinal axis of the same, the flat nozzle slot thus ends on a first end within the projection surface while protruding beyond the projection surface by its other, second end. The first end forms that side on which the air emerges vigorously and straight forward, thus drying accordingly strongly. By contrast, the second end forms that side on which the air is strongly deflected, escapes sidewards and hence urges the liquid on the surface to the side.

Furthermore, the flat nozzle slot is advantageously formed on a flat nozzle fan having the form of an equilateral triangle. The triangular shape results when looking from the side at the flat nozzle device and the associated tube with the flat nozzle attached thereto. Such an equilateral-triangular shape causes the compressed air coming from the tube to be further conducted straight forward in a certain region of the flat nozzle, i.e. in the base of the triangular shape, whereas it is comparatively strongly deflected in the tip of the triangular shape.

The flat nozzle device, moreover, is preferably again formed with a tube for supplying the compressed air to the flat nozzle, and the handle is oriented so as to be inclined at an angle smaller than 90°, preferably at an angle between 45° and 75°, particularly preferably at an angle of 60°, relative to the longitudinal axis of the tube. The thus oriented handle is very convenient to grip for the user of the flat nozzle device according to the invention, while simultaneously giving them clear and precise feedback on how the air emerges from the associated flat nozzle device and what distances to the surface to be dried are to be observed there.

A preferred configuration provides that the flat nozzle device comprises at least one partition dividing the flat nozzle slot into at least two slot portions in the longitudinal direction. The at least one partition connects the two parallel boundary walls of the flat nozzle slot, keeping them at the structurally predefined distance relative to each other. The at least one partition thus prevents the expansion of the flat nozzle slot in the sense of an increase in the exit height of the slot due to the pressure of the escaping compressed air.

Basically, the number of partitions is freely selectable, the partitions preferably being equally distributed over the length of the flat nozzle. A configuration comprising a single partition as a central partition dividing the flat nozzle portion into two equally long longitudinal portions is preferred.

The at least one partition is preferably disposed directly at the nozzle exit and may have a small extension in the direction of the air flow.

The at least one partition, on its end facing away from the nozzle slot, preferably comprises an inflow edge or surface, which is curved, in particular concavely curved. This will not only reduce the development of noise but also cause the air flows separately emerging from the longitudinal portions of the nozzle slot to combine to a somewhat homogenous, consistent air flow rather than acting as separate air flows. This will ensure effective drying of the surface to be dried even in the narrow region of the partition.

Another preferred further development of the flat nozzle provides that the latter, on its exit-side edge, comprises a flexible element, in particular a flexible lip, which serves to protect the surface to be dried from damage in the event of a contact or collision of the flat nozzle with the same. Preferably, a flexible lip is each provided on the two parallel longitudinal edges of the flat nozzle at the nozzle exit, preferably extending substantially over the entire length of the longitudinal edges. In particular, the flexible lip extends over the entire periphery of the flat nozzle slot.

The flexible element can be made of a flexible plastic material such as silicone or the like.

In the following, an exemplary embodiment of a solution according to the invention will be explained in more detail by way of the accompanying schematic drawings. Therein:

Figure 1:
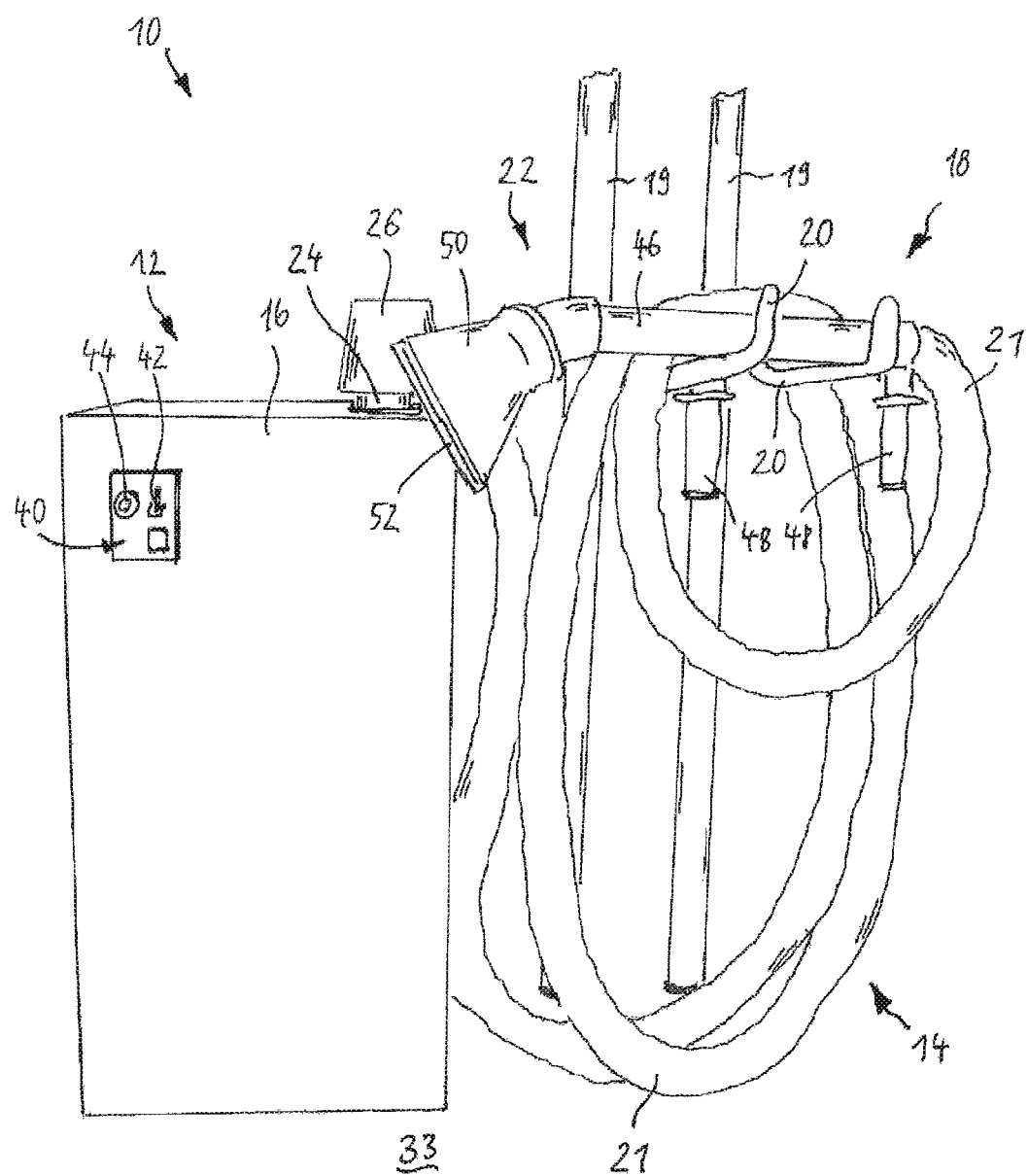
FIG. 1 depicts a side view of an exemplary embodiment of a handheld blower device according to the invention.
Figure 2:
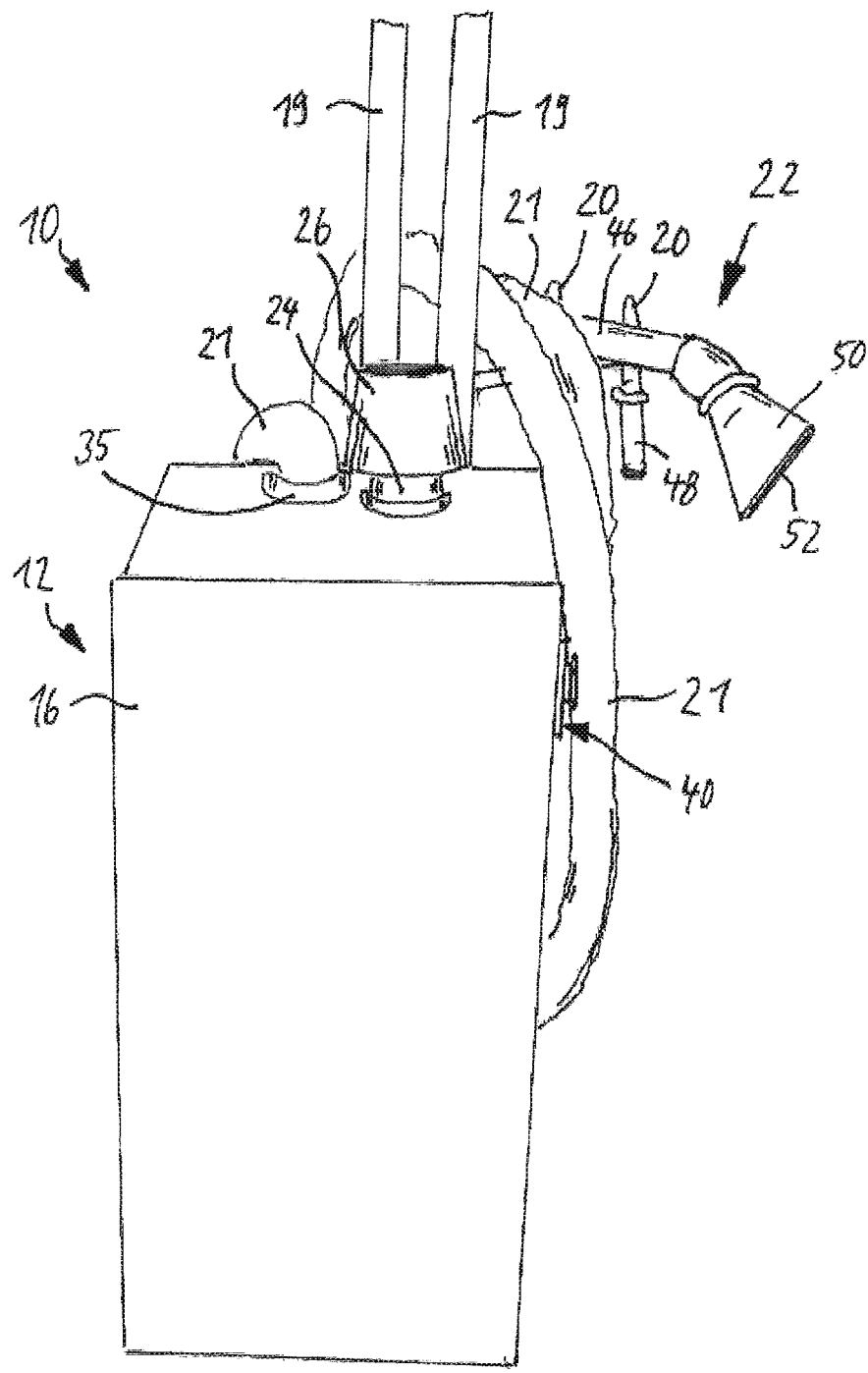
FIG. 2 is a front view of the handheld blower device according to FIG. 1 with its housing.
Figure 3:
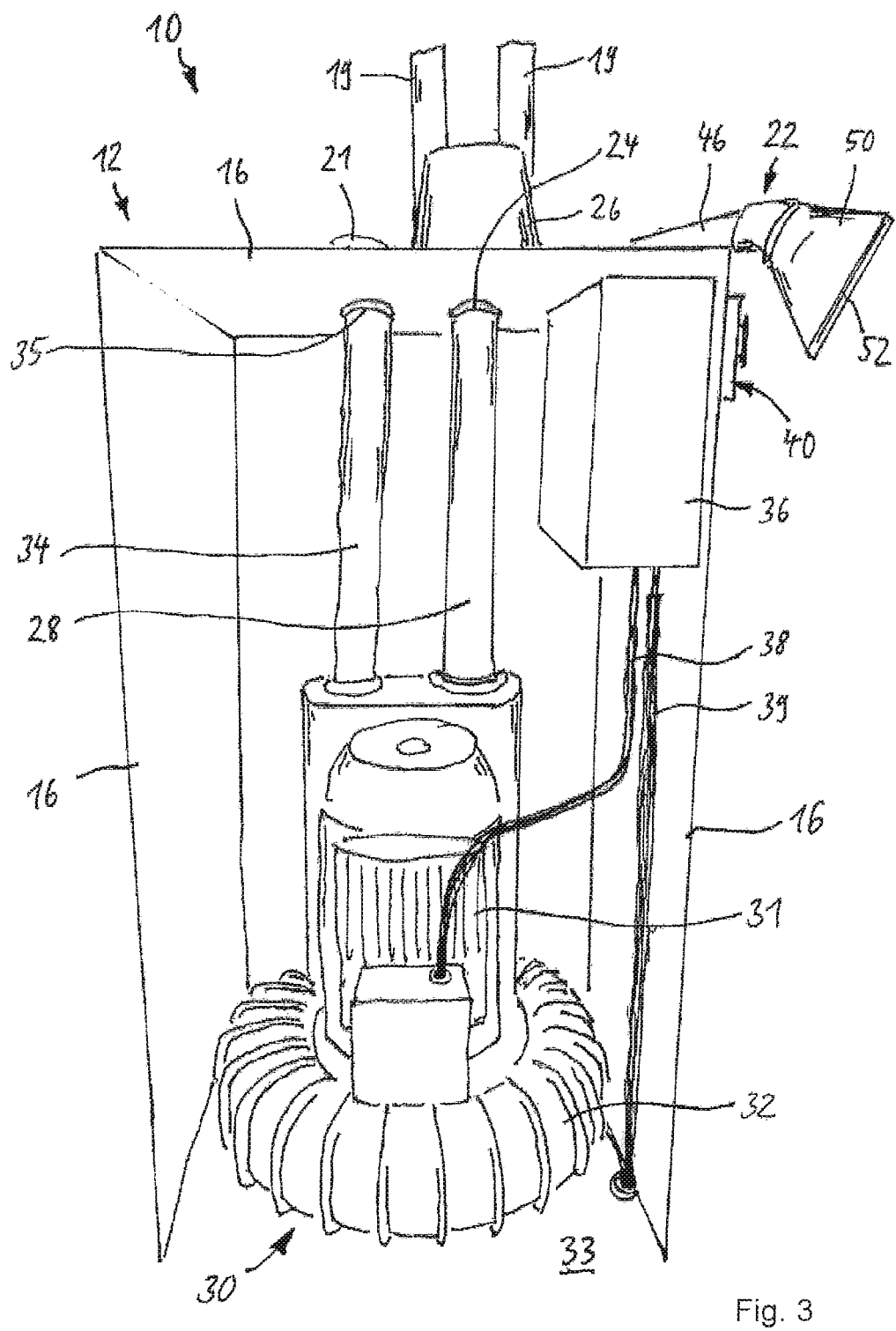
FIG. 3 shows the front view according to FIG. 2 on an enlarged scale with the housing opened.

FIGS. 1 to 3 illustrate a handheld blower device 10 for pneumatically drying surfaces such as motor vehicles or building glazings. The handheld blower device 10 comprises a stationary part 12, which is shown on the left-hand side in FIG. 1, and a movable part 14, which is shown on the right-hand side in FIG. 1.

The stationary part 12 comprises a stationary, cubical housing 16 and an adjacently arranged, stationary holding device 18. The latter is formed with two vertical support posts 19 and carrier arms 20 horizontally cantilevering therefrom.

The movable part 14 comprises a flexible hose 21, which is connected to the housing 16 by one of its two ends. To the other end of the hose 21, a manually movable flat nozzle device 22 is attached.

The housing 16 and its content are illustrated in more detail in FIG. 3. On the upper side of the housing 16 is provided an air inlet 24 equipped with a frustoconical filter 26. The filter 26 projects upwardly from the upper side of the housing 16. The air inlet 24 reaches through the housing 16 into the interior of the latter. There is provided an inlet tube 28 leading perpendicularly downwards to a high-pressure blower 30. The high-pressure blower 30 is designed as a side channel compressor or side channel blower, producing a conveying pressure of higher than 100 mbar, in particular higher than 250 mbar, during operation. It is driven by an electromotor 31 having a current draw of 400 V and a power consumption of between 3 and 10 kW, in particular between 5 and 10 kW. The motor 31 is disposed in the center of the housing 16 with a vertically oriented axis of rotation. A substantially torus-shaped conveying channel 32 of the high-pressure blower 30 with the (internal) side channel contained therein is oriented in the horizontal plane, i.e. in parallel with an installation surface 33. The high-pressure blower 30 is stationarily attached or fastened directly to the installation surface 33, and the housing 16 all around has no housing bottom. This makes mounting particularly stable in terms of statics and particularly cushioned in terms of acoustics. Moreover, the arrangement is particularly advantageous to clean.

In the interior of the housing 16 is arranged a controller 36 for the motor 31, which is operatively coupled to the motor 31 via an electric line 38 and which is further coupled to an external power source (not illustrated) via an electric supply line 39. Outside the housing 16, a control panel 40 is provided where the controller 36 is arranged inside. The controller 36 can be operated by a user of the handheld blower device 10 at the control panel 40 via a coin slot device 42 and a kill switch 44.

To the conveying channel 32 of the high-pressure blower 30 is further connected an outlet tube 34, which leads vertically upwards to an air outlet 35. The air outlet 35 passes through the housing 16, on the upper side of the same. On the outer side, the flexible hose 21 is connected to the air outlet 35 by one of its ends. The hose 21 has a hose diameter of between 30 and 100 mm, in particular between 50 and 100 mm, in particular between 50 and 70 mm, or between 70 and 90 mm. The hose length ranges between 5 and 10 m, in particular between 7 and 9 m. In operation, the high-pressure blower 30 generates a flow rate of compressed air of 5 to 100 m/s, in particular 20 to 100 m/s, in particular 40 to 80 m/s, or 50 to 90 m/s, in the hose 21.

The flat nozzle device 22 provided on the other end of the hose 21 comprises an approximately 50 cm long tube 46 whose diameter corresponds to that of the hose 21. Two handles 48, or alternatively just one handle, are attached to the tube 46 so as to protrude radially. A user of the handheld blower device 10 can grip and manually guide the flat nozzle device 22 by the handles 48.

On the end of the tube 46 facing away from the hose 21, a flat nozzle 50 is provided, which is designed as a flat nozzle. The flat nozzle comprises a straight flat nozzle slot 52 with an exit width of 100 to 250 mm, currently 180 mm, and an exit height of 0.5 to 20 mm, in particular 1 to 10 mm, currently 5 mm.

Figure 4:
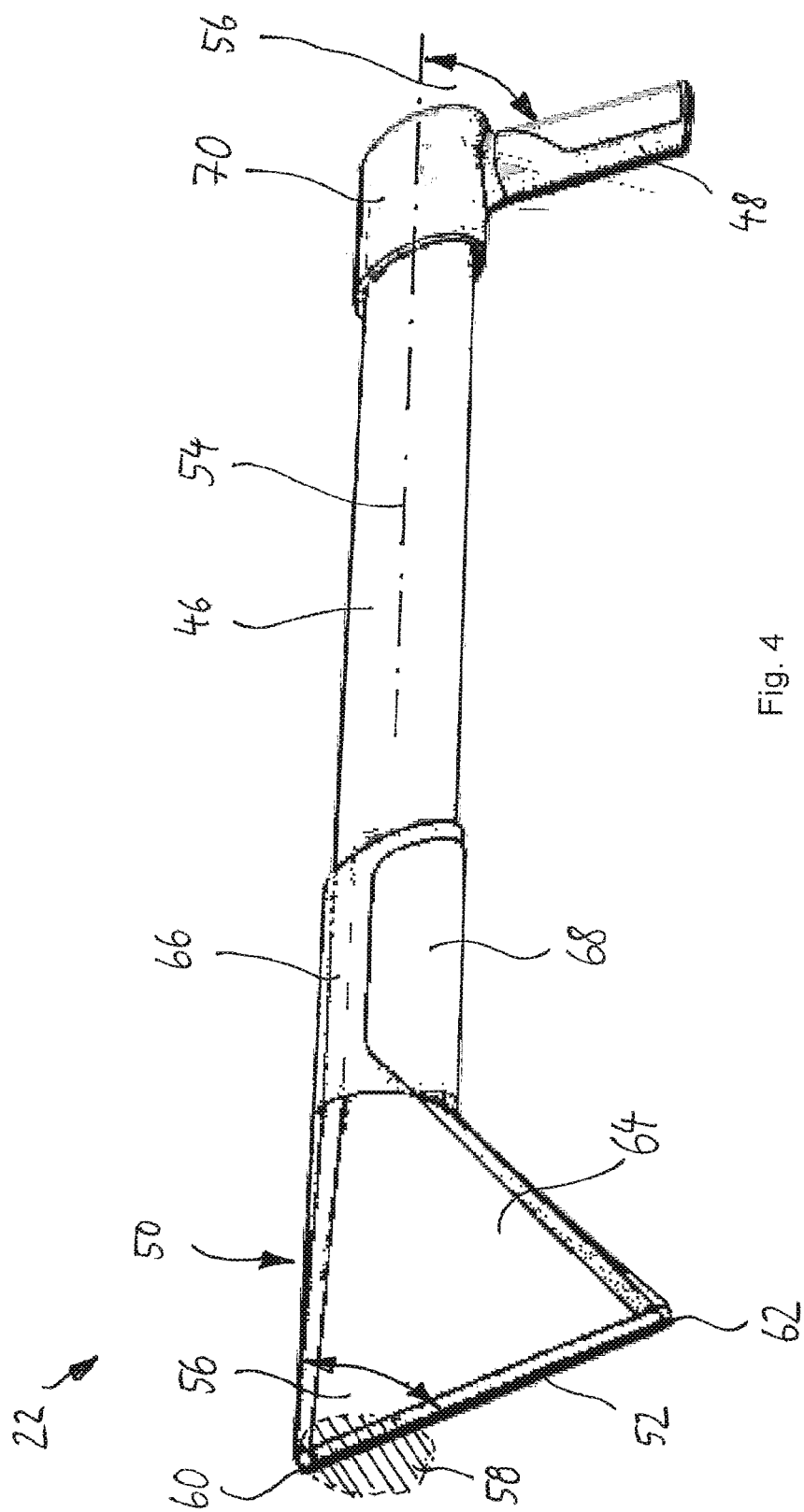
FIG. 4 depicts a side view of an exemplary embodiment of a flat nozzle device for the handheld blower device according to FIGS. 1 to 3.

FIG. 4 illustrates an embodiment of the flat nozzle device 22, which is likewise designed with a tube 46 and a flat nozzle 50 attached to the end of the same. The flat nozzle 50 comprises a flat nozzle slot 52, which is inclined or obliquely oriented relative to a longitudinal axis 54 of the tube 46. The flat nozzle slot 52 encloses an angle 56 of 60° relative to the longitudinal axis 54. The flat nozzle slot 52 is located not symmetrically to the tube 46 but eccentrically, based on the projection surface 58 thereof. A first end region or first end 60 of the flat nozzle slot 52 extends completely within the projection surface 58, while a second end region or second end 62 protrudes beyond the projection surface 58. In this manner, the flat nozzle 50 is altogether designed as a nozzle fan 64 which, viewed from the side as illustrated in FIG. 4, substantially has the shape of an equilateral triangle.

From said nozzle fan 64 extends, towards the tube 46, a flat nozzle tube 66, whose diameter is slightly larger than that of the tube 46 so as to be slipped on the tube 46. A grip plate 68 is provided on the flat nozzle tube 66, on the downwardly oriented side thereof, i.e. the lower side of the flat nozzle device 22 based on FIG. 4. The grip plate 68 encompasses the air-conducting tube 46 and planarly contacts the outer surface area thereof, approximately about half of its circumference. At the same time, a handhold 70 is provided on that lower side of the flat nozzle device 22, on the other end of the tube 46, which handhold is also slipped on the tube 46. From said handhold 70, the handle 48 protrudes downwardly, also at an angle 56 of 60° based on the longitudinal axis 54 of the tube 46.

The handle 48 and the grip plate 68 thus provide to the user two handling areas on the flat nozzle device 22, by which the flat nozzle device 22 can be guided in a particularly advantageous and safe manner over a surface to be dried or cleaned.

Figure 5:
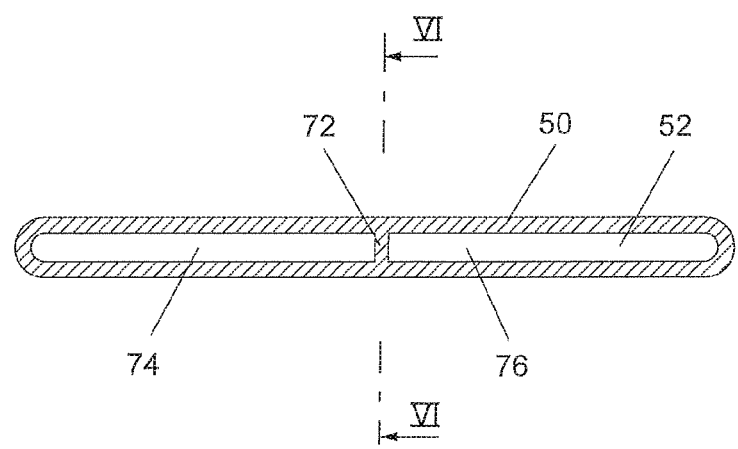
FIG. 5 is a front view of the flat nozzle slot.

In the front view of the exit opening of the flat nozzle 50 of FIG. 5, a preferred configuration of the flat nozzle 50 is shown, in which a central partition 72 connects the upper and the lower walls delimiting the flat nozzle slot 52. The central partition 72 divides the flat nozzle slot 52 into a slot portion 74 and a slot portion 76. The central partition 72 holds the upper and the lower walls at a pregiven distance relative to each other.

Figure 6:
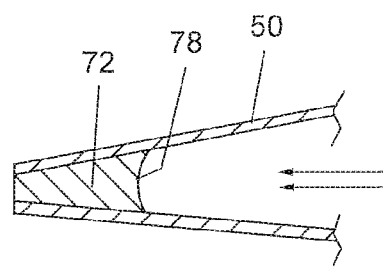
FIG. 6 is a sectional view along line VI-VI of FIG. 5.

As illustrated in the sectional view according to FIG. 6, the central partition 72 may comprise a concavely curved inflow edge 78 to avoid acoustic excitation. The production of annoying whistling noises will thereby be counteracted.

Figure 7:
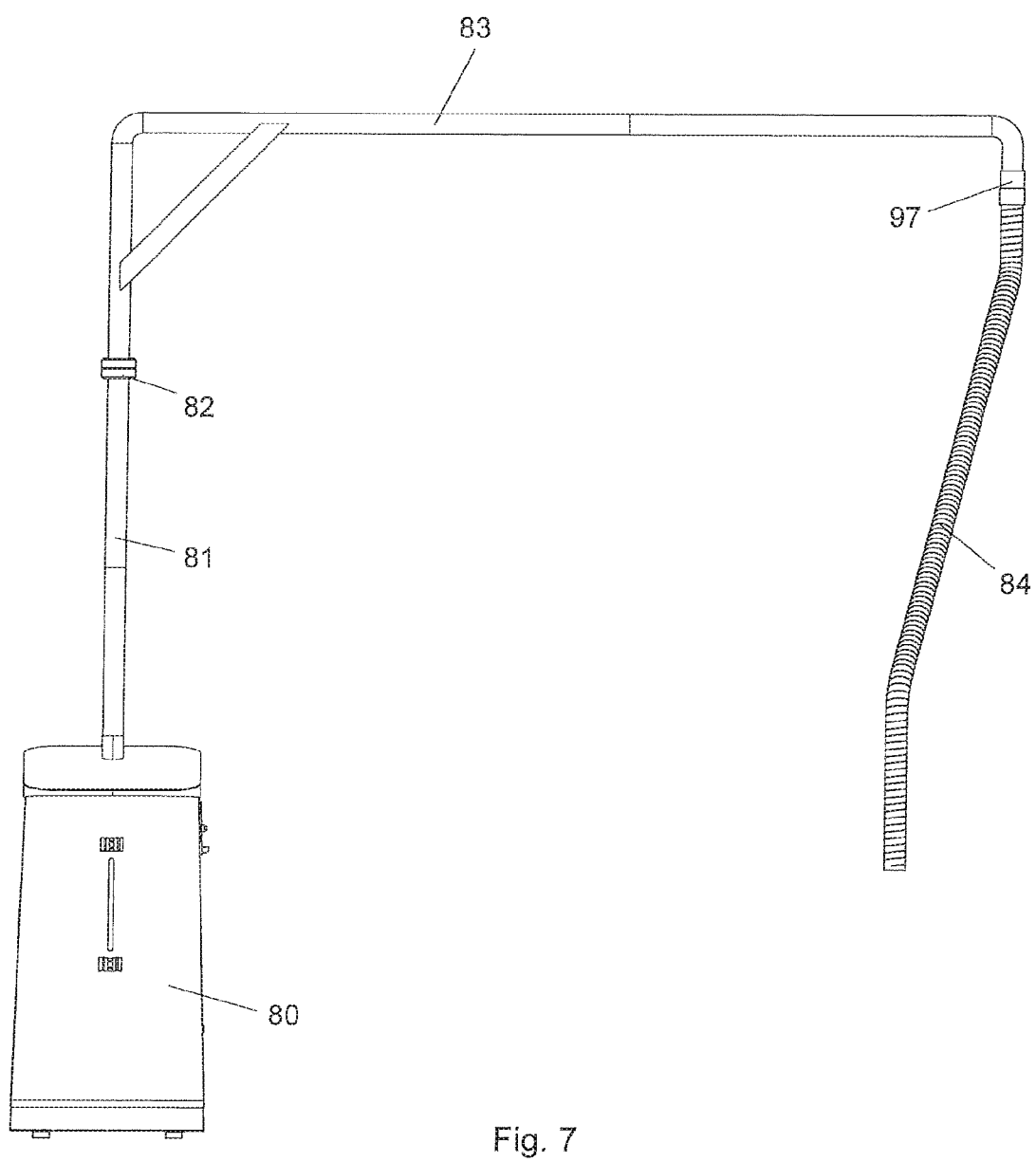
FIG. 7 illustrates a modified configuration of a handheld blower device.

FIG. 7 depicts a modified configuration of a handheld blower device 80, which is adapted for use by commercial providers. Unlike in the configuration according to FIGS. 1-3, the handheld blower device 80 is connected to a vertically extending, rigid tube 81 rather than directly to a flexible hose. To the rigid tube 81 is connected, via a rotating flange 82, a further tube 83 comprising an angle of 90° so as to provide a horizontal cantilever. On its end facing away from the handheld blower device 80, the tube 83 comprises a further angle of 90° to which a flexible hose 84 is connected, to whose end a flat nozzle device (not illustrated) can be attached. The rotating flange 82 allows for a rotation of the tube 83 relative to the tube 81 about a vertical axis of rotation extending in the direction of the tube axis of the tube 81 such that the flexible hose 84 is displaceable over a wide area together with the flat nozzle device, and a vehicle positioned beside the handheld blower device 80 and below the horizontal tube 83 can be easily dried from all sides.

Figure 8:
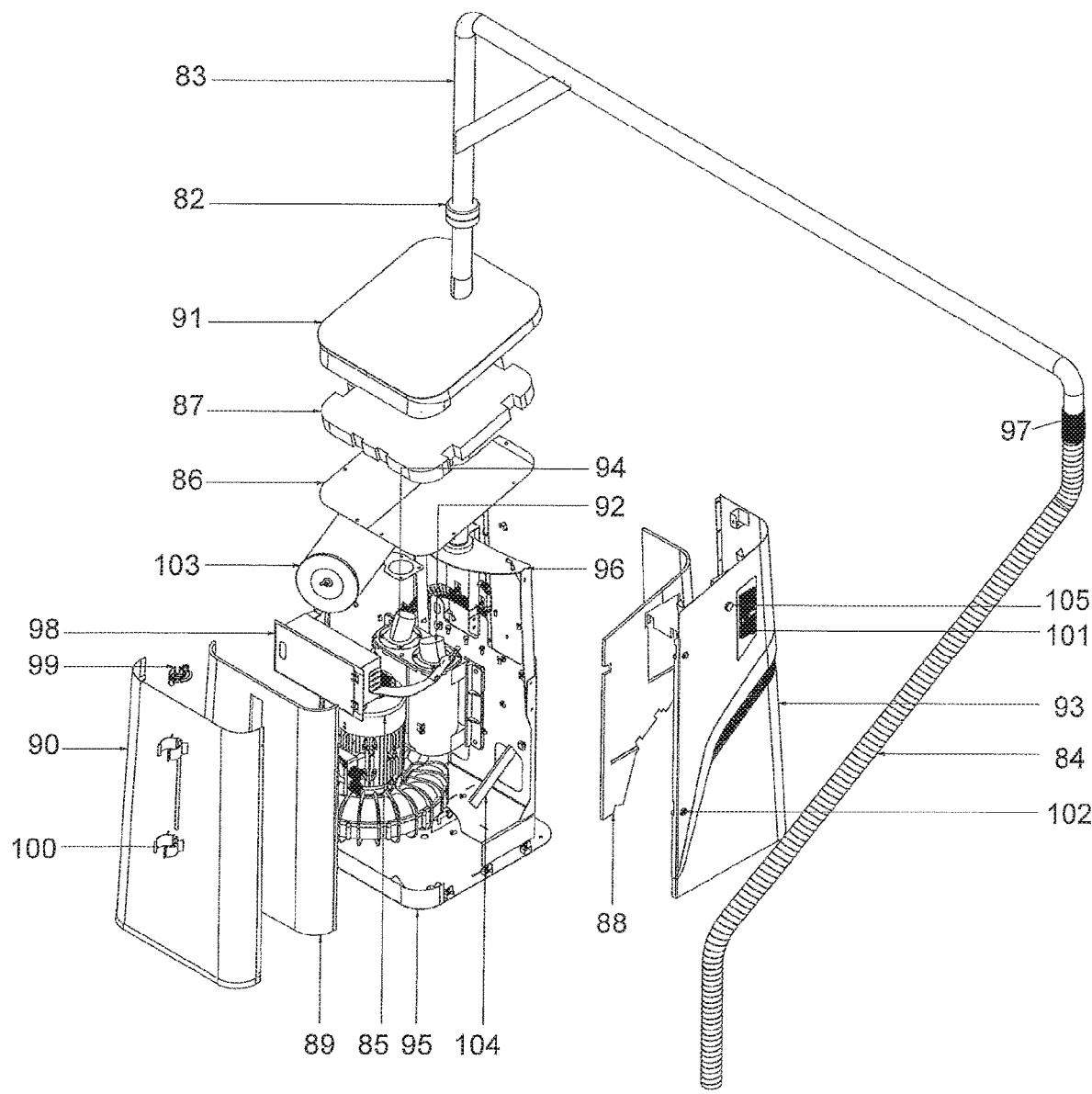
FIG. 8 is an explosive view of the handheld blower device according to FIG. 7.

In the explosion view according to FIG. 8, the handheld blower device 80 is shown disassembled. The following components are visible:
80 handheld blower device
81 tube
82 rotating flange
83 tube
84 hose
85 high-pressure blower
86 noise protection net
87 glass wool
88 lateral acoustic insulation
89 front acoustic insulation
90 front housing part
91 upper housing part
92 inlet tube
93 lower left-hand housing part
94 outlet tube
95 base plate
96 connection holder
97 rotating flange
98 control box
99 hinge
100 tube holder
101 front plate
102 locking elements
103 air filter
104 LED panel
105 actuation of background illumination During operation of the handheld blower device, a volume flow of 50 to 500 m³/h, or 200 to 1000 m³/h, in particular 350 to 500 m³/h, or 300 to 850 m³/h, is conveyed through the flat nozzle device by means of the high-pressure blower. In doing so, a flow rate of 50 to 300 m/s, in particular 100 to 200 m/s, is generated by the high-pressure blower through the flat nozzle device.

The handheld blower device according to the invention is suitable not only for drying surfaces but also for cleaning or cleansing surfaces by blowing off. In particular, the handheld blower device is advantageously suitable for clearing surfaces from dust and sand deposits. This function is of particular advantage in countries of the Earth where surfaces are quickly covered by dust due to environmental influences, such as countries of desert and steppe zones.

In addition, the handheld blower device according to the invention is advantageously provided with a heating means for the ejected compressed air. Such a heating means will advantageously heat the air to be ejected, downstream of the high-pressure blower viewed in the flow direction. It is preferably disposed in the region of the outlet tube and designed as an electric heating system. In an advantageous manner, the waste heat of the motor can also be used for heating air to be ejected. By the waste heat, the ejected air can be heated to a temperature between 30 and 50° C.

Finally, it should be noted that any characteristic features cited in the application document and, in particular, in the dependent claims shall be assigned substantive protection despite the formal references to one or several specific claims, either individually or in any combination.

LIST OF REFERENCE NUMERALS 10 handheld blower device
12 stationary part
14 movable part
16 housing
18 holding device
19 support post
20 carrier arm
21 hose
22 flat nozzle device
24 air inlet
15 filter
28 inlet tube
30 high-pressure blower
31 motor
32 conveying channel
33 installation surface
34 outlet tube
35 air outlet
36 controller
38 line
39 supply line
40 control panel
42 coin slot device
44 kill switch
46 tube
48 handle
50 flat nozzle
52 flat nozzle slot
54 longitudinal axis of the tube
56 angle
58 projection surface
60 first end of flat nozzle slot
62 second end of flat nozzle slot
64 nozzle fan
66 flat nozzle tube
68 grip plate
70 handhold
72 central partition
74 flat nozzle portion
76 flat nozzle portion
78 inflow edge
80 handheld blower device
81 tube
82 rotating flange
83 tube
84 hose
85 high-pressure blower
86 noise protection net
87 glass wool
88 lateral acoustic insulation
89 front acoustic insulation
90 front housing part
91 upper housing part
92 inlet tube
93 lower left-hand housing part
94 outlet tube
95 base plate
96 connection holder
97 rotating flange
98 control box
99 hinge
100 tube holder
101 front plate
102 locking elements
103 air filter
104 LED panel
105 actuation of background illumination

The invention claimed is:
1. A handheld blower device for manual pneumatic drying of surfaces by a user of the handheld blower device, comprising a flat nozzle device for ejecting compressed air from the handheld blower device onto a surface to be dried, a handle region comprising a handle for manually gripping and guiding the flat nozzle device over the surface to be dried, and a conveying device for conveying the compressed air to the flat nozzle device, whereby the flat nozzle device comprises a flat nozzle, and the conveying device is configured with a stationarily arranged or fixedly arranged, high-pressure blower housed in a housing, the housing comprising an air inlet, wherein the high-pressure blower is designed as a side channel compressor configured to receive inlet air from the air inlet in a first direction, convey the inlet air laterally and rotationally for compression, and output the compressed air through an outlet and to the flat nozzle device, and wherein a volume flow of 350 m³/h to 500 m³/h and a flow rate of 100 m/s to 150 m/s are provided by the high-pressure blower due to the flat nozzle device, wherein a motor of the high-pressure blower is arranged in a lower portion of the housing and wherein the air inlet is equipped with a filter.

2. The handheld blower device according to claim 1, wherein the conveying device comprises a flexible hose connected to the outlet of the housing at one end and the flat nozzle device at the other end, the flexible hose connecting the output from the high-pressure blower to the flat nozzle device.

3. The handheld blower device according to claim 2, wherein within the flexible hose a flow rate of 20 m/s to 100 m/s is provided by the high-pressure blower.

4. The handheld blower device according to claim 2, wherein the flat nozzle device is formed with a tube for supplying the compressed air to the flat nozzle, and the handle is oriented so as to be inclined at an angle smaller than 90° relative to a longitudinal axis of the tube.

5. The handheld blower device according to claim 1, wherein a flow rate of 120 m/s to 130 m/s is provided by the high-pressure blower due to the flat nozzle device.

6. The handheld blower device according to claim 1, wherein a flow rate of 40 m/s to 100 m/s measured at a distance of 7 cm from a nozzle exit in a flow direction, is provided by the high-pressure blower due to the flat nozzle device.

7. The handheld blower device according to claim 1, wherein the flat nozzle is formed with a flat nozzle slot having an exit surface of 500 mm² to 1500 mm².

8. The handheld blower device according to claim 1, wherein the flat nozzle is formed with a flat nozzle slot having an exit width of 100 mm to 300 mm.

9. The handheld blower device according to claim 1, wherein the flat nozzle is formed with a flat nozzle slot having an exit height of 0.5 mm to 20 mm.

10. The handheld blower device according to claim 9, wherein the flat nozzle slot is formed on a flat nozzle fan having the form of an equilateral triangle.

11. The handheld blower device according to claim 1, wherein the flat nozzle is formed with a substantially rectangular flat nozzle slot whose ratio of exit width to exit height ranges from 25 to 60.

12. The handheld blower device according to claim 1, wherein
the flat nozzle device is formed with a tube for supplying the compressed air to the flat nozzle, and the flat nozzle is formed with a flat nozzle slot that is oriented so as to be inclined at an angle smaller than 90° relative to a longitudinal axis of the tube.

13. The handheld blower device according to claim 12, wherein the flat nozzle slot is oriented so as to be inclined at an angle of between 45° and 75° relative to the longitudinal axis of the tube.

14. The handheld blower device according to claim 12, wherein the flat nozzle slot is oriented so as to be inclined at an angle of 60° relative to the longitudinal axis of the tube.

15. The handheld blower device according to claim 12, wherein the flat nozzle slot terminates within a projection surface of the tube by one of its two ends.

16. The handheld blower device according to claim 1, wherein a grip plate for holding the flat nozzle device by the user is provided on the flat nozzle.

17. The handheld blower device according to claim 1, wherein the flat nozzle comprises at least one partition dividing the flat nozzle slot into at least two slot portions in a longitudinal direction.

18. Using the handheld blower device according to claim 1, for the manual pneumatic drying of surfaces in vehicle bodies or building glazings.

19. The handheld blower device according to claim 1, further comprising an inlet tube connected to the air inlet and an outlet tube connected to the outlet, both the inlet tube and the outlet tube being provided in the housing and both extending vertically relative to the high-pressure blower, wherein the high-pressure blower comprises a substantially torus-shaped conveying channel and is oriented in a horizontal plane, and wherein the first direction of the inlet air is in a vertically downward direction and a direction for output is in a vertically upward direction.

* * * * *